(No Model.) 3 Sheets—Sheet 2.
C. J. LUCE.
CAR BRAKE AND STARTER.

No. 447,780. Patented Mar. 10, 1891.

WITNESSES:

INVENTOR
Charles J. Luce
BY
Price & Stewart
his ATTORNEYS

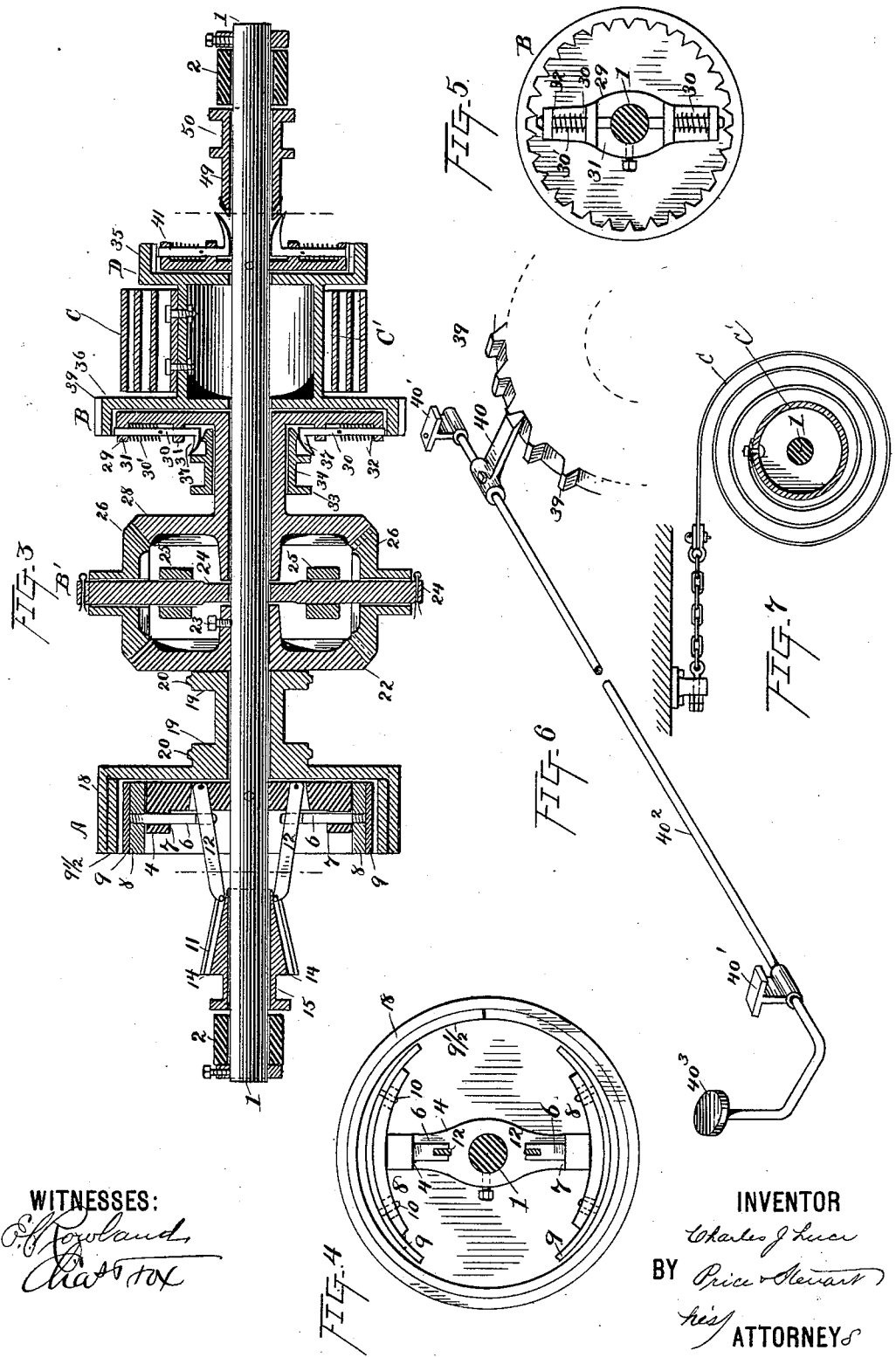

UNITED STATES PATENT OFFICE.

CHARLES J. LUCE, OF NIANTIC, CONNECTICUT.

CAR BRAKE AND STARTER.

SPECIFICATION forming part of Letters Patent No. 447,780, dated March 10, 1891.

Application filed May 29, 1890. Serial No. 353,554. (No model.)

*To all whom it may concern:*

Be it known that I, CHARLES J. LUCE, a citizen of the United States, and a resident of Niantic, in the county of New London and State of Connecticut, have invented certain new and useful Improvements in Car Brakes and Starters, of which the following is a specification.

My invention relates to improvements in devices for braking and starting vehicles illustrated in the accompanying drawings, in which—

Figure 1:
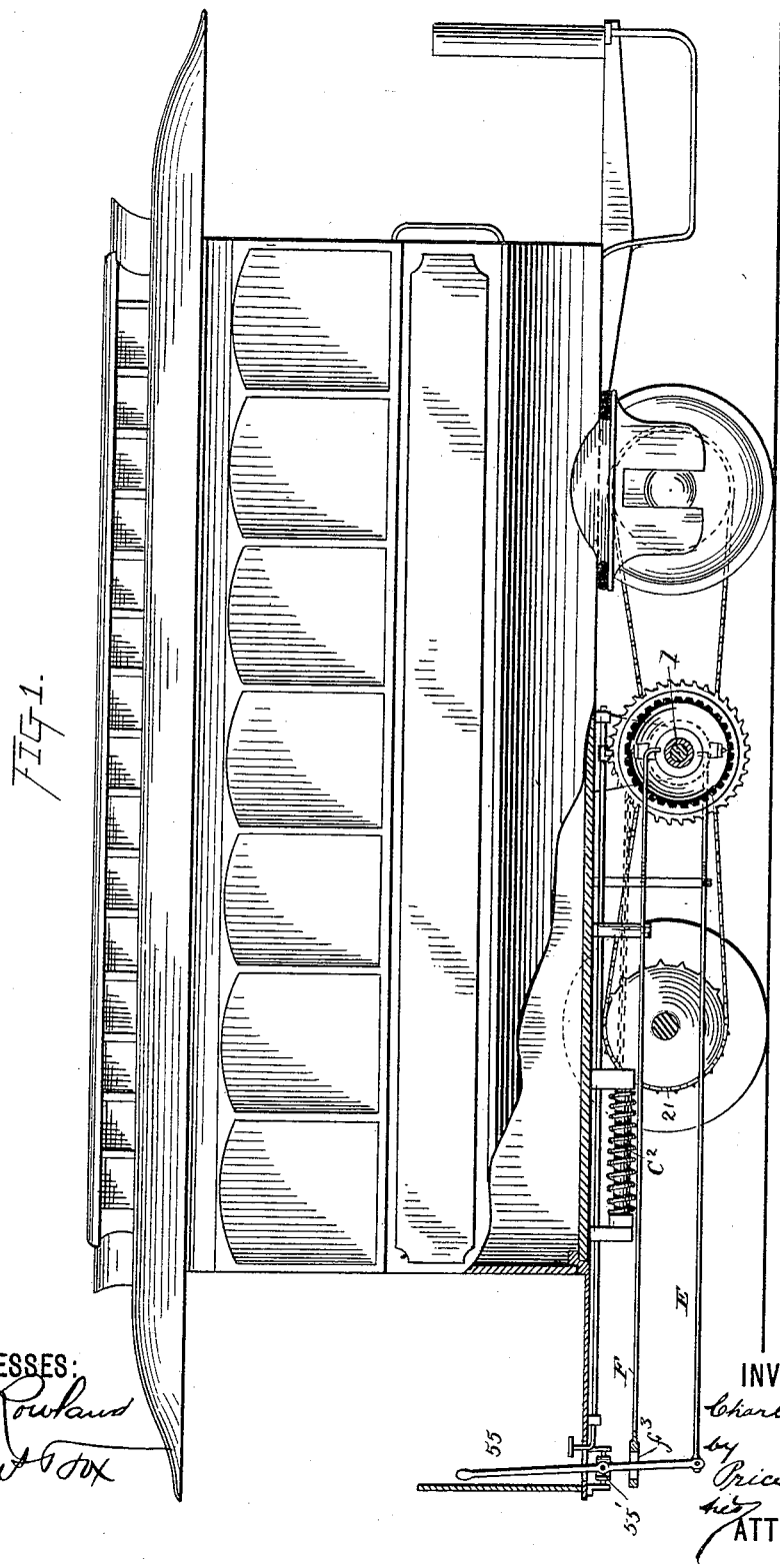
Figure 2:
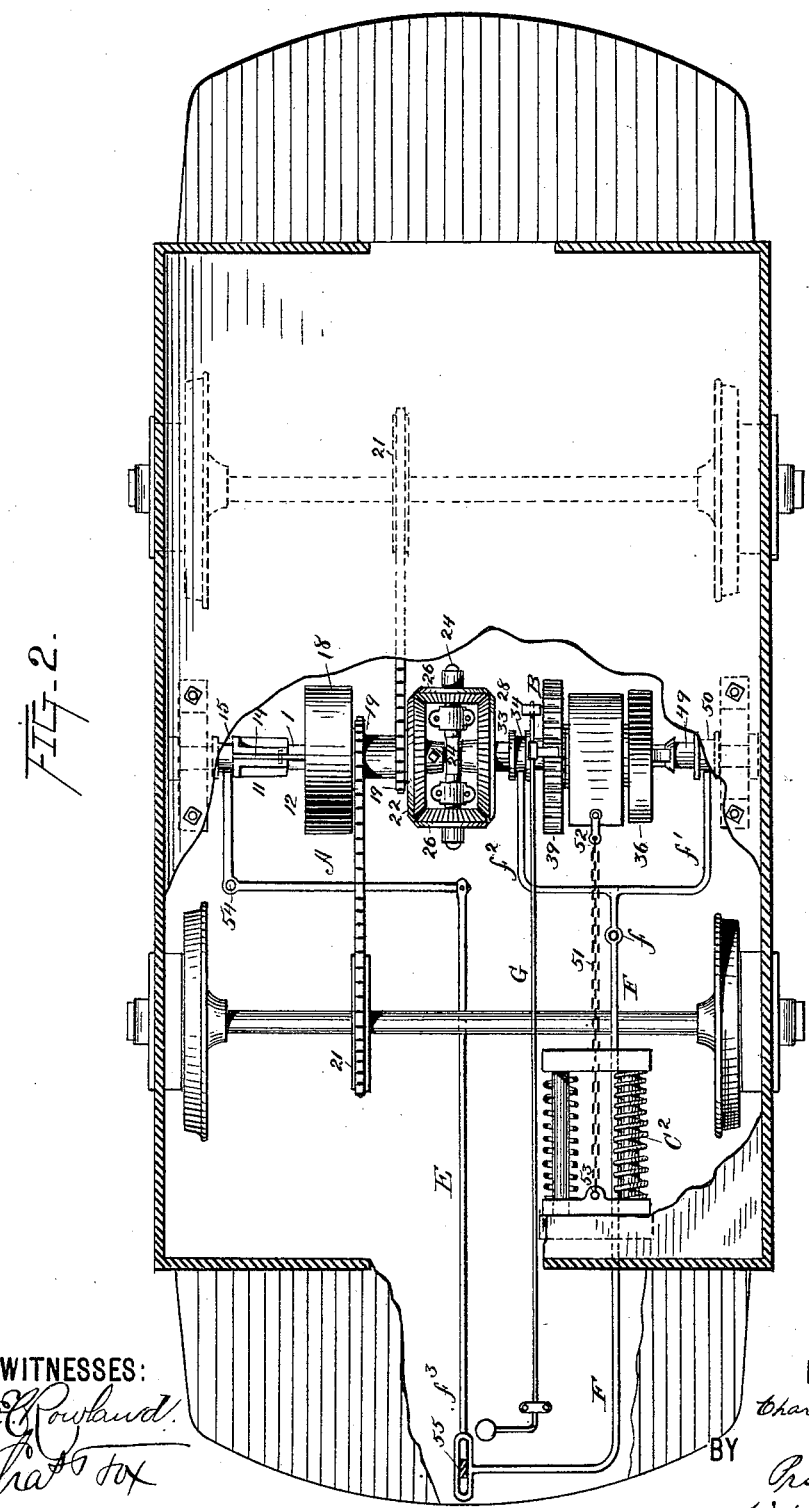

Figure 1 is an elevation of a car with one wheel removed, and showing a side view of the device as applied thereto. Fig. 2 illustrates a top view of the mechanism, the body and part of the floor of the car removed. Fig. 3 is a vertical sectional view of the supplemental shaft and mechanisms mounted thereon. Fig. 4 is a side view of the frictional clutching device; Fig. 5, a side view of the positive clutching device. Fig. 6 is a perspective view of the ratchet upon the circumference of wheel 36 and the pawl co-operating therewith. Fig. 7 is a cross-section of the cylinder located between the wheels 35 and 36, showing the coiled spring thereon and its connections at one end with the cylinder and at the other end with a stationary bracket secured to the bottom of the car, and may also represent the coiled spring attached to the supplemental shaft 1 directly.

Similar letters and figures refer to similar parts throughout the several views.

The shaft 1 is journaled in the brackets 2 and 2, which are suitably secured to the bottom of the car. Upon this shaft is mounted the frictional clutching device A, which consists of a bracket 4, mounted on the shaft 1 and secured thereto. The two bolts 6 and 6 work in ways 7 and 7 provided therefor in the bracket. To the outer end of these bolts are fastened the bearings 8 and 8, and the shoes 9 and 9 fit over these bearings and are prevented from sliding laterally by the pins 10 and 10, which enter corresponding slots in the shoes provided for the purpose. Over these shoes and next to the rim of the wheel is located the ring 9½, cut across at a point on its circumference. Suitably pivoted to the bracket 4 are the levers 12 and 12, the opposite ends of which are provided with cross-pins, which slide in T-shaped slots 14 and 14, formed in the cone 11, and co-operate with the cone to throw in or out of engagement the bolts 6 and 6. The cone 11 is loosely mounted on the shaft 1 and may slide thereon longitudinally, and is provided with the circumferential groove 15 to receive the end of the lever or shifting device E. The bracket 4, bearings 8 8, and shoes 9 9 are arranged to fit loosely on the inside of the hollow friction-wheel 18 and within its overlapping rim. When the cone 11 is withdrawn and the levers 12 and 12 are in the position shown in Fig. 3, the loosely-mounted wheel 18 revolves upon the shaft 1. When the cone is moved to engage the bolts and lock the friction-clutch A, the shaft 1 revolves with the wheel 18. It will be seen that this clutching device is not rigidly positive but frictional, allowing some give to the parts to prevent breaking. The wheel 18 may be provided with the sprocket-wheels 19 19, which may be cast thereon as part of the wheel or otherwise secured thereto. They are provided with teeth 20 to co-operate with the links of a chain connecting them with sprocket-wheels 21 and 21, which are secured to the axles of the car.

The bevel gear-wheel 22 is mounted on the shaft 1 and secured thereto. The cross-shaft 24 is provided with a central opening, through which the shaft 1 passes and is suspended by the brackets 25 and 25, properly secured to the bottom of the car, which are provided with journals to receive the shaft 24; or the shaft 24 and bracket 25 may be cast in one piece. Mounted upon the ends of this shaft 24 are the beveled gear-wheels 26 and 26. One of these wheels may be omitted; but I prefer to use two. Also loosely mounted on the shaft 1 is the beveled gear-wheel 28 and the brackets of the bolting mechanism 29 of the positive clutching device B. These may be cast in one piece or firmly connected together, and are shown in sections in Fig. 3, and the device 29 is shown in a front view in Fig. 5. The bolting device 29 consists of the bracket 31, the bolts 30 30, which work in the ways 32 32, and the bolts are maintained in an unlocked position by the spiral springs 30' 30'. The cone-shaped sleeve 33 is loosely mounted upon the connecting-piece between the wheel 28 and the bolting device 29, so as to slide laterally thereon, and is provided with a circumferential groove 34. The outer ends of the bolts 30 engage with the teeth on the interior of the overlapping rim of the wheel 36, and at the other end are provided with the inclined projections 37 and 37 to engage the beveled edge of the sleeve 33, as shown in Fig. 3. The wheel 36 is provided on its external rim with the ratchets 39 to engage the pawl 40. (See Fig. 6.) The part 35 is similarly constructed to receive the bolting device 41, which is firmly secured to the shaft, and these two parts together form the positive clutching device D. The wheel 36 is rigidly connected with the wheel 35, either cast in one piece or suitably secured to each other in such manner as to leave a cylindrical space between them in the form of a hollow drum or pulley, to the periphery of which is fastened one end of a coiled spring C, which is at its other end attached to the bottom of the car through the medium of the chain 51 and spiral spring; or the coil-spring may be omitted and the chain 51 may be attached directly to the periphery of the drum C′ in such manner that when the cylindrical drum is revolved in a direction to wind the coil-spring the spring is tightened to brake the moving vehicle; or the coil-spring may be omitted and the chain 51 attached directly to the drum to wind upon it and co-operate with the spiral spring attached to the bottom of the car. In either case the power thus stored is used to assist in starting the vehicle.

The coiled spring C may be attached directly to the bottom of the car, as shown in Fig. 7, omitting the spiral-spring device shown in Fig. 2; or in one of the arrangements of my device the coil-spring C may be fastened at one end directly to the shaft 1 and the other end to the bottom of the car. Fig. 7 illustrates this connection, considering the pulley shown in that drawing as the supplemental shaft 1.

Loosely mounted on the shaft 1 is the sliding sleeve 49, arranged to co-operate with the bolting device 41 in the same manner as that already described on the bolting device 29. This sliding sleeve is provided with a circumferential groove 50 to receive one end of the shifting bar or lever F.

Securely attached to the bottom of the car is the spiral-spring device shown in Fig. 1 in elevation and in Fig. 2 in a top view. This spiral-spring device $C^2$ may be constructed in any of the well-known forms, and its object is to co-operate with the coil-spring C. They are connected by the chain or rod 51 at the points 52 and 53.

The shifting devices are as follows: The bell-crank lever E is fulcrumed at the point 54, having one arm extending into the circumferential groove 15 of the cone 11, so as to operate the cone by sliding it back and forward on the shaft 1. The other or longer arm is connected with the lever 55, which passes up through the platform of the car, and is suitably fulcrumed thereto, so as to be within easy reach of the hand of the operator or driver. The other shifting device consists of the forked lever F, being fulcrumed, as at $f$, and having its two ends $f'$ and $f^2$ inserted within the circumferential grooves 34 and 50 of the sliding sleeves 33 and 49. Its other and longer end extends forwardly and is provided at its end with the slot $f^3$, through which the lever 55 passes, and is operated by moving said lever sidewise. Thus the lever 55 operates the cone 11 by a backward-and-forward movement and the sliding sleeves 33 and 49 by a movement at right angles. The operating-lever 55 possesses these two movements by reason of the fact that it is fulcrumed in a swinging swivel-joint 55′, which enables it to move backward and forward to operate one of the levers and sidewise to operate the other.

On each of the axles of the car are securely fastened the sprocket-wheels 21 and 21, which are suitably connected with the sprocket-wheels 19 and 19 by an endless chain.

The brackets 40′ and 40′ are secured to the bottom of the car, and journaled within them is the shaft $40^2$ and $40^2$, at one end of which is attached the pawl 40, at the other end the crank-arm and knob $40^3$. This knob passing through the floor of the car in a convenient position to be operated by the foot of the driver, the pawl 40 engaging the ratchet 39, the operation of pressing the knob $40^3$ causes the pawl 40 to be released from the ratchet 39. The pawl 40 is held in engagement with the ratchet 39 by a spring or other suitable means.

The operation of my device is such that when the car is in motion the sprocket-wheels 21 and 21, which are fast to the axles of the car, revolve therewith and turn the wheel 18 in the same direction as the revolving axles through the medium of the sprocket-wheels 19 and 19 and chain. This wheel 18, loosely mounted on the shaft 1, simply turns upon said shaft without affecting any of the other parts until it is fastened or secured to the shaft by the driver or operator moving the lever to slide the cone 11 inwardly and throw out the bolts 6 6 to tighten the shoes frictionally upon the inner rim of the wheel 18. The wheel 18 then turns the shaft 1 in the same direction with the revolving axles. The effect of turning this shaft is to turn the beveled gear-wheel 22, secured to said shaft, in the same direction with the revolving axles, and the beveled gear-wheel 28, which is loosely mounted on said shaft, in the opposite direction, and this latter will have no operation upon the wheels 36 and 35 unless the locking device 29 is bolted to the wheel 36, but will simply turn upon the shaft 1. The locking device 41, however, being secured to the shaft 1 and the positive clutch being locked and the shaft 1 revolving, as before described, the wheels 36 and 35 and their intermediate cylinder are turned by the shaft, thus winding the spring C upon the periphery of the cylinder. This spring may have its opposite end fastened to any suitable projection from the bottom of the car, and the device may be worked entirely for braking or starting by using the coil-spring alone; but I prefer to operate it in connection with a spiral spring and in combination therewith, and in such case the end of the coil-spring opposite to that attached to the cylinder is secured to the bar, rod, or chain, which operates the spiral spring $C^2$. This latter, being preferably of greater tension than the coil-spring wound upon the drum, begins to contract only when the coil-spring has reached the limit of its tension, and furnishes a safeguard to prevent breakage occurring from a too rigid construction of its parts, or accident which may occur in the course of travel. It will be seen by this arrangement that the tension of one or both of these springs co-operating together operate as a brake to stop the car and are both held in the position of tension by the pawl 40, which co-operates with the ratchet 39 upon the circumference of the wheel 36 and holds this spring or springs in position until this pawl is released. The next operation will depend upon whether the driver desires to start his car in a backward or forward direction. If backward, he simply releases the pawl from the ratchet on the wheel 36. If forward, (while the wheel 36 is still held by the pawl,) he releases the locking device 41 from the wheel 35, closes the locking device 29 upon the wheel 36, which operations are both performed by a single movement of the forked lever F, and then releases the pawl and sets free the wheel 36. When the car is going in the opposite direction from that last described and it is desired to stop it, the wheel 18 is frictionally tightened to the shaft, turning the shaft therewith, which turns the beveled gear 22 in the same direction, which in its turn revolves the beveled gear 28 and the locking device 29 in the opposite direction. The locking device 29 is then closed upon the wheel 36 by a movement of the lever F, which at the same time releases the locking device 41 from the wheel 35. By this operation the coil-spring C and the spiral spring $C^2$, one or both, are tightened, the car is restrained or stopped by this tension, and the tension stored and held by the pawl and ratchet heretofore described. Here again the driver is to determine whether in utilizing this tension in starting the vehicle he desires the force of this spring to be exerted in a forward or backward direction. If backward, he simply releases the pawl, and if forward he releases the locking device 29 and closes locking device 41 and releases the pawl.

The foregoing is the usual operation of my device; but when used simply as a brake all of the parts except the shaft 1, friction-clutch A, and its connections with the axle may be omitted and the coil-spring secured at one end to the shaft and by the other at the bottom of the car. The operation of this arrangement would be that of braking the car by the tension of the spring. In this case a retaining and releasing device, consisting of a ratchet and pawl similar to that previously described, is fixed to the shaft 1.

What I claim, and desire to secure by Letters Patent, is—

1. In an apparatus for braking a vehicle, the combination of a supplemental shaft, as 1, having loosely mounted thereon a wheel, as 18, means for revolving this wheel about the shaft, driven by one of the axles of the vehicle, means for tightening the shaft to this wheel frictionally, and means for holding the shaft stationary, substantially as described.

2. In an apparatus for braking and starting a vehicle, a supplemental shaft, as 1, upon which is loosely mounted a wheel, as 18, means for revolving this wheel upon the shaft, connected with and driven by one of the axles of the vehicle, and means for tightening the shaft to the wheel frictionally, controlled by the operator, in combination with a coiled spring secured to the shaft at one of its ends and to the bottom of the car at the other and wound on the shaft when it revolves, and means for retaining the spring in tension and for releasing the same, controlled by the operator, substantially as described.

3. In an apparatus for braking and starting a vehicle, a supplemental shaft, as 1, having loosely mounted thereon the wheel 18, with means for revolving this wheel on the shaft, connected with and driven by one of the axles of the vehicle, and means for tightening frictionally and securing the shaft to the wheel 18, controlled by the operator, in combination with a winding-drum, as C, loosely mounted on the shaft and provided with a coil-spring, one end of which is secured to the periphery of the drum and the other end to the bottom of the car, means for securing the drum to the supplemental shaft to wind the spring and to brake the car, means for holding and releasing the spring, and means for imparting a forward and backward movement to the shaft in starting or braking the vehicle, controlled by the operator, substantially as described.

4. In an apparatus for braking and starting a vehicle, a supplemental shaft, as 1, having loosely mounted thereon the wheel 18, with means for revolving this wheel on the shaft, connected with and driven by one of the axles of the vehicle, and means for tightening frictionally and securing the shaft to the wheel 18, controlled by the operator, in combination with a winding-drum, as C, loosely mounted on the shaft and provided with a coil-spring, one end of which is secured to the periphery of the drum and the other end to another spring, which is secured to the bottom of the car, means for securing the drum to the supplemental shaft to wind the spring and to brake the car, means for holding and releasing the spring, and means for imparting a forward and backward movement to the shaft in starting or braking the vehicle, controlled by the operator, substantially as described.

5. In an apparatus for braking and starting a vehicle, a supplemental shaft, as 1, having loosely mounted thereon the wheel 18, with means for revolving this wheel on the shaft, connected with and driven by one of the axles of the vehicle, and means for tightening frictionally and securing the shaft to the wheel 18, controlled by the operator, in combination with a winding-drum, as C, loosely mounted on the shaft, a spiral spring secured to the bottom of the vehicle, and means to connect the spiral spring and the drum C, means for securing the drum to the supplemental shaft, to wind the spring, and to brake the car, means for holding and releasing the spring, and means for imparting a forward and backward movement to the shaft in starting or braking the vehicle, controlled by the operator, substantially as described.

Signed at New York, in the county of New York and State of New York, this 29th day of April, A. D. 1890.

CHARLES J. LUCE.

Witnesses:
JAMES L. STEUART,
WALTER L. MCCORKLE.